United States Patent
Garber (10) Patent No.: US 8,500,034 B2
(45) Date of Patent: Aug. 6, 2013

(54) TEMPERATURE CONTROLLER FOR DIRECT MOUNTING TO THE OBJECT TO BE CONTROLLED

(75) Inventor: Richard S. Garber, Saint Paul, MN (US)

(73) Assignee: Engenity LLC, Saint Paul, MN (US)

( * ) Notice: Subject to any disclaimer, the term of this patent is extended or adjusted under 35 U.S.C. 154(b) by 840 days.

(21) Appl. No.: 12/588,001

(22) Filed: Sep. 30, 2009

(65) Prior Publication Data

US 2011/0073668 A1    Mar. 31, 2011

(51) Int. Cl.
  *G05D 23/19*    (2006.01)
  *G01K 7/00*    (2006.01)
(52) U.S. Cl.
  USPC ................ 236/1 C; 236/78 D; 374/188
(58) Field of Classification Search
  USPC ........ 236/1 C, 78 D, 101 R, 101 E; 374/187, 374/188, 205
  See application file for complete search history.

(56) References Cited

U.S. PATENT DOCUMENTS 4,631,728 A * 12/1986 Simons ........................... 372/34
6,079,121 A * 6/2000 Khadkikar et al. ............. 34/528

OTHER PUBLICATIONS

Engenity, LLC, SoliStat Flyer, Rev. B, 2008.

* cited by examiner

*Primary Examiner* — Marc Norman
(74) *Attorney, Agent, or Firm* — Oliff & Berridge, PLC (57) ABSTRACT

An integrated solid-state temperature controller that is mountable to an object the temperature of which is controlled by the solid-state temperature controller, or is mountable in a space in which the temperature is controlled by the solid-state temperature controller. The solid-state temperature controller able to withstand and continue to operate in extremes of temperatures at which the object or space is controlled, and able to withstand and continue to operate in extremes of temperatures of the object or space when the temperature is not being controlled.

27 Claims, 8 Drawing Sheets

TEMPERATURE CONTROLLER FOR DIRECT MOUNTING TO THE OBJECT TO BE CONTROLLED

BACKGROUND

This disclosure is directed to a device and methods for a temperature controller that is mounted directly to the object whose temperature the device and methods are controlling.

There are numerous applications in which the temperature of an object or a space must be controlled within a close tolerance. Conventionally, control is performed by a controller connected to a temperature measuring device or temperature sensor. A comparison is made generally between a measured or sensed temperature and a preset temperature. The controller then controls power to a heater or cooler to control the temperature of the object or space to within a predetermined limited range from the set temperature.

Figure 1:
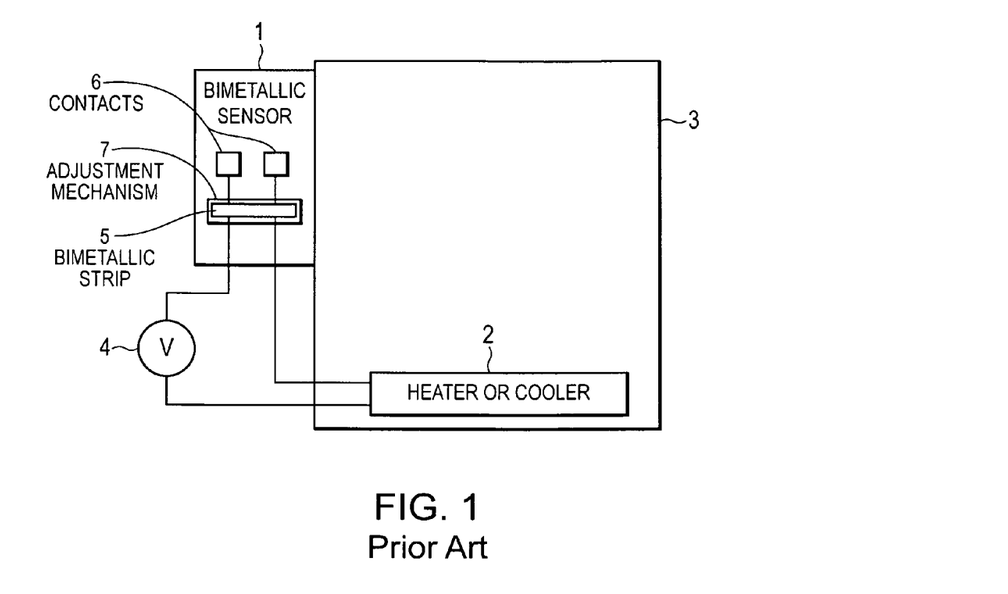
FIG. 1 illustrates a conventional bimetallic strip temperature control system.

One conventional method to achieve temperature control from an attached controller involves applying a bimetallic strip at least as the sensor element. FIG. 1 shows a conventional bimetallic strip controller. The bimetallic sensor 1 is mounted on an object 3. A heater or cooler 2 is provided to heat or cool the object 3. A power supply 4 provides power to the heater 2. The bimetallic strip controller 1 includes a bimetallic strip 5, contacts 6 and an adjustment mechanism 7. The bimetallic strip may also be mounted within a space where the temperature is to be controlled.

As the temperature changes, the bimetallic strip 5 will bend or straighten depending on the temperature of the bimetallic strip 5. Bimetallic strip temperature sensors are designed so that the bimetallic strip 5 is bistable, and has two stable states. Depending upon the temperature and the inherent stress caused by that temperature, the bimetallic strip 5 will alternate between the two states. The advantage of the bistablity is that a deadband forms due to hysterisis and the state does not alternate back and forth at a single temperature set point. The state will change from a first state to a second state at a first temperature, but change from the second state back to the first state at a slightly different second temperature. This deadband between the first and second temperatures means that when the object or space is maintained in a temperature range near the set temperature such that the heater or cooler is not being constantly switched on and off.

Assuming that the object 3 must be held above ambient temperature the heater or cooler 2 is a heater. The bimetallic strip 5 is in close contact with the object 3 and has approximately the same temperature as object 3. When the temperature of object 3 is below a first preset temperature that is, a little above the desired temperature, defined by adjustment mechanism 7, the bimetallic strip is stressed by the low temperature into the first stable state, so that contacts 6 are connected. Power flows from the voltage source 4 to the heater 2. As a result, the object 3 warms up along with the bimetallic strip 5. When the temperature reaches the first preset temperature, the bimetallic strip is stressed by the change in temperature and changed to the second stable state in which the contacts 6 are broken. Power is then disconnected from the heater 2 and the object 3 will cool until the temperature two a second preset temperature, a little below the desired temperature. At which point the bimetallic strip will change back to the first stable state in which contacts 6 are connected and the heater 2 will begin to heat object 3 once more. This process continues keeping the object 3 within the deadband temperature range, around the desired set temperature.

The adjustment mechanism 7 allows the adjustment of the set temperature and the deadband. The adjustment mechanisms 7 of these bimetallic strips 5 usually involve setscrews or dials, and due to the nature of the bimetallic strip 5, it is difficult to precisely set the set temperature and the deadband.

Bimetallic strip controllers are convenient because they are small, mountable to any surface, durable and adaptable to numerous temperature ranges. They are also fairly reliable and inexpensive to produce for a specific application. Further, the bimetallic strip controller and, therefore, the entire control system can be mounted on a surface of the object or within the space to be controlled. All of the elements of the bimetallic strip controller can easily be made to withstand extremes of temperature so the set temperature can vary over a wide range. Further, no external connections or control are required.

Figure 2:
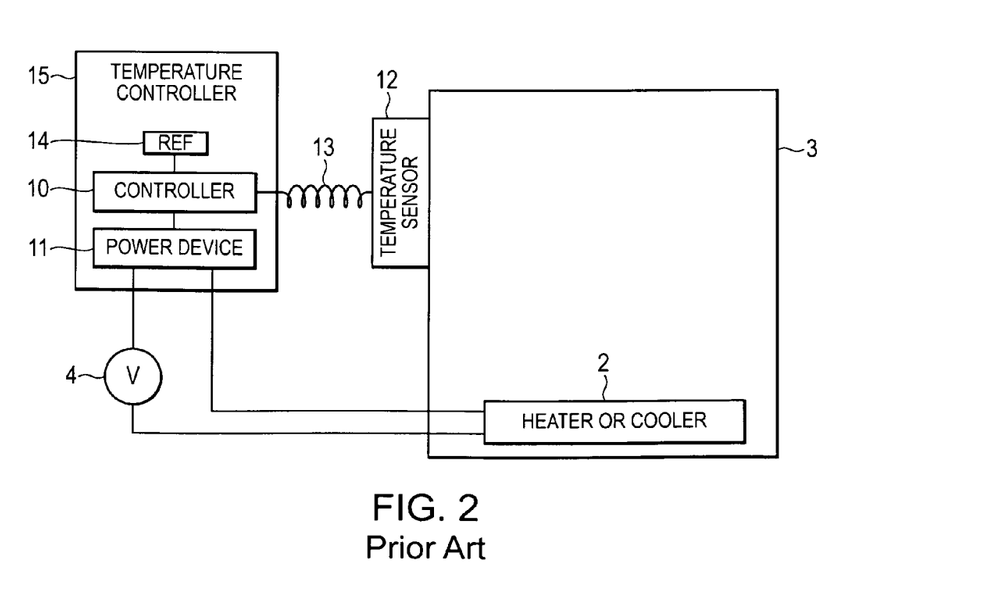
FIG. 2 illustrates a conventional solid-state temperature control system.

Another conventional method to achieve temperature control is to use a solid-state controller. FIG. 2 shows conventional solid-state controller approach. Object 3, heater and cooler 2 and voltage source 4 are the same as that shown in FIG. 1. The temperature of object 3 is sensed by a temperature sensor 12. This temperature sensor 12 might be a thermal couple, a dedicated semiconductor temperature sensor, a thermistor, a resistive temperature-sensing device (RTD) or the like. The temperature sensor 12 is connected by wiring 13 to a temperature controller 15. The temperature controller 15 integrates several components. A controller 10 is used to compare the temperature measured by temperature sensor 12 to some reference 14. The reference 14 is used to derive first and second preset temperatures around a set temperature. When the temperature sensed by temperature sensor 12 is below the first preset temperature, the controller 10 controls a power device 11 to allow current to pass from the voltage source 4 to the heater 2. The power device may be a high-powered transistor thyristor, or TRIAC, or some manner of electromechanical relay to control the power. When the controller 10 measures a temperature above first preset temperature, the controller 10 controls power device 11 to switch preventing current flowing to heater 2 so that the object 3 cools. When the controller 10 measures a temperature below the second preset temperature, the controller 10 controls power device 11 to switch allowing current flowing to heater 2 so that the object 3 heats once more. As with the bimetallic strip controller, this process continues keeping the object 3 within a deadband around the set temperature.

The various components in the controller 15 are in general temperature sensitive but their performance is more susceptible to changes in temperature even to the point of destruction. Therefore, in these kinds of control systems only the temperature sensor 12 is generally placed on the object 3 or in the space, to be controlled (particularly where the object or space temperature are to be controlled to extremes of temperature). Other components are placed in controller 15, which is often remotely placed in an environment that is less extreme than that of object 3. This need to place temperature controller 15 in a less harsh environment than that of object 3 presents many issues with additional wiring, additional casing, and a need to find the less harsh environment.

A considerable advantage of bimetallic strip controllers such as that in FIG. 1, is that the components used to make the bimetallic strip controller can stand an extreme range of temperatures. The bimetallic strip controller can simply be mounted on the object, without the additional wiring and casing.

Bimetallic strips are still widely used because of the above issues with remotely placing the solid-state controller 15. Bimetallic strips controllers, however, have problems of their own. If the currents to be controlled are large, and the heater or cooler load is inductive, large sparks are formed as the contacts are made and broken to switch on and off the heater or cooler. This rapidly destroys the contacts. There are many locations where the environment may contain explosive vapors or liquids, and these sparks may ignite fires or explosions. Further, to adjust the set point temperature and the deadband for a bimetallic strip is not trivial and often involves a number of set screws or dials that change the point at which the bimetallic strip will change from the first state to the second state. Adjusting the bimetallic strip device is, also difficult, as there is often not a good correlation between the set point of any individual screw or dial and the set point temperature or deadband. Further, because the accuracy of the set point temperature and the width of the deadband are imprecise, the width of the deadband often cannot be made relatively small. Conversely, even if the width of the deadband could be reduced, the width determines how often the contacts of the controller switch and therefore how fast the contacts wear.

Solid-state base controllers on the other hand can be very accurately controlled and the predetermined range relatively easily adjusted. Further, if a solid-state device controls the power, then there is no disadvantage for example with regard to contact wear, or the generation of sparks, that may cause ignition.

Solid-state controllers have one further advantage, which is that increasingly precise and sophisticated methods for controlling temperature can be implemented. For example, a heater or cooler may be varyingly controlled such that it is effectively maintained in a third state between an off and an on state. A power control device of a solid-state controller may operate in a pulse width modulation technique in which the heater or cooler is rapidly switched on and off, the ratio of on time to off time determining the heating or cooling. Because any heater or cooler can be operated somewhere between fully on and fully off, the solid-state controller can implement techniques such as a proportional integral differential (PID) algorithm to control the temperature. These algorithms lead to more accurate and stable temperature control because they have no deadband. Further, these algorithms stabilize temperature fast when the device is first switched on, and is moving towards a set temperature, or if external conditions around the object or space to be controlled change so that more or less heat is required.

SUMMARY

In view of the above, it would be advantageous to provide a solid-state temperature control device that has the advantages of limited size and being mounted fully and directly on the object or in the space to be controlled like that of a bimetallic strip controller, but also has the precision, safety and an adaptability of the solid-state circuiting.

In view of the above-discussed shortfalls, it may be advantageous to provide a solid-state control device with components for temperature measurement and control, and power control combined within one package to be mounted to an object, or in a space, whose temperature is to be controlled which avoids the negative impacts of the components for temperature measurement and control, and power control being at the temperature of the object. According to the exemplary embodiments a single package solid-state temperature controller may be adapted to be mounted to an object to be controlled or placed in a space to be controlled. The temperature controllable package and all of the components shall be capable of performing accurate temperature control even while being subjected to the same temperature as that of the object, and even in instances where the temperature is extreme.

The systems and methods according to this disclosure may provide a solid-state temperature controller integrated into a single package that can be mounted to a surface of an object to be controlled or the surface confining a space where temperature is to be controlled.

The systems and methods according to this disclosure may provide a solid-state controller integrated into a single package that can precisely control the temperature of an object or a space within the deadband of a set point temperature.

The systems and methods according to this disclosure may provide a solid-state temperature controller integrated into a single package that can provide PID control to the object or the space temperature.

The systems and methods according to this disclosure may provide an integrated solid-state controller in a single package that can be reprogrammed in situ, either by a wired or wireless connection to relatively easily change the set temperature and the deadband.

The systems and methods according to this disclosure may provide a solid-state temperature controller integrated into a single package that provides a safe alternative to bimetallic strip controllers in explosive or flammable environments. The systems and methods according to this disclosure may provide a part-for-part replacement by bimetallic strip controllers as an upgrade to the systems and methods already deployed in the field, or as a direct substitute for bimetallic strips in currently designed equipment.

The systems and methods according to this disclosure may provide a solid-state temperature controller integrated into a single package that provides temperature control of the temperature of an object or space to extreme temperatures in which the solid-state temperature controller, when subject to such extremes, continues to operate and control the temperature accurately.

The systems and methods according to this disclosure can and continue to operate, and control temperature, even when the object is at, or has been to, extreme temperatures far from the set temperature.

The systems and methods according to this disclosure provide a solid-state controller in which the temperature sensor is strongly thermally coupled to the object, or space, whose temperature is to be controlled but the remaining circuit elements are only weakly thermally coupled to both the temperature sensor, and the object, or space, whose temperature is to be controlled.

The systems and methods according to this disclosure provide a solid-state controller in which the various elements that comprise the solid-state controller are arranged to avoid mechanical stress on the elements due to differential thermal coefficients of expansion of the elements, and mechanical stress on the elements due to temperature gradients within the a solid-state controller.

These and other features and functions of the disclosed systems and methods are described in, or apparent from, the following detailed description of various exemplary embodiments.

BRIEF DESCRIPTION OF THE DRAWINGS

Various exemplary embodiments of the disclosed systems and methods for a temperature controller are described, in detail, with reference to the following drawings wherein.

DETAILED DESCRIPTION OF EMBODIMENTS

Various exemplary embodiments of the disclosed systems and methods for providing an integrated solid-state controller that can be mounted on an object or in a space whose temperature is to be controlled are disclosed. These exemplary embodiments allow the integrated solid-state controller to operate at extreme temperature to which the object or space is controlled, yet still maintain the accuracy of the set temperature and, if the embodiment has a deadband, the accuracy of that deadband.

Figure 3:
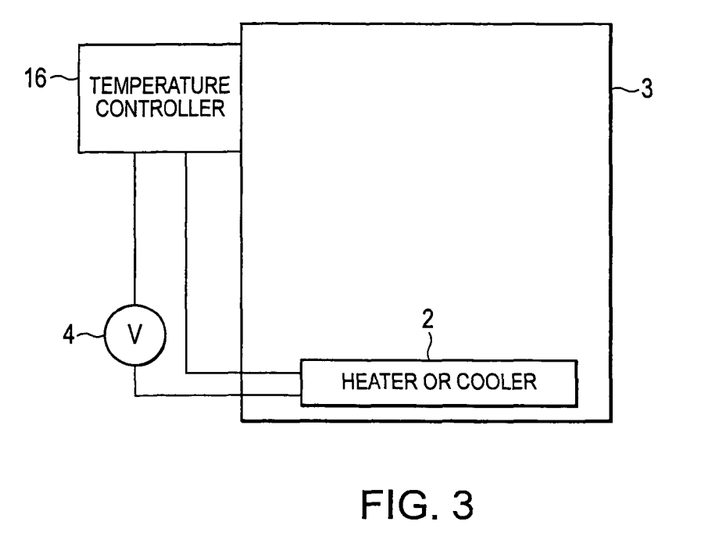
FIG. 3 illustrates an exemplary embodiment of a solid-state controller according to this disclosure.
Figure 4:
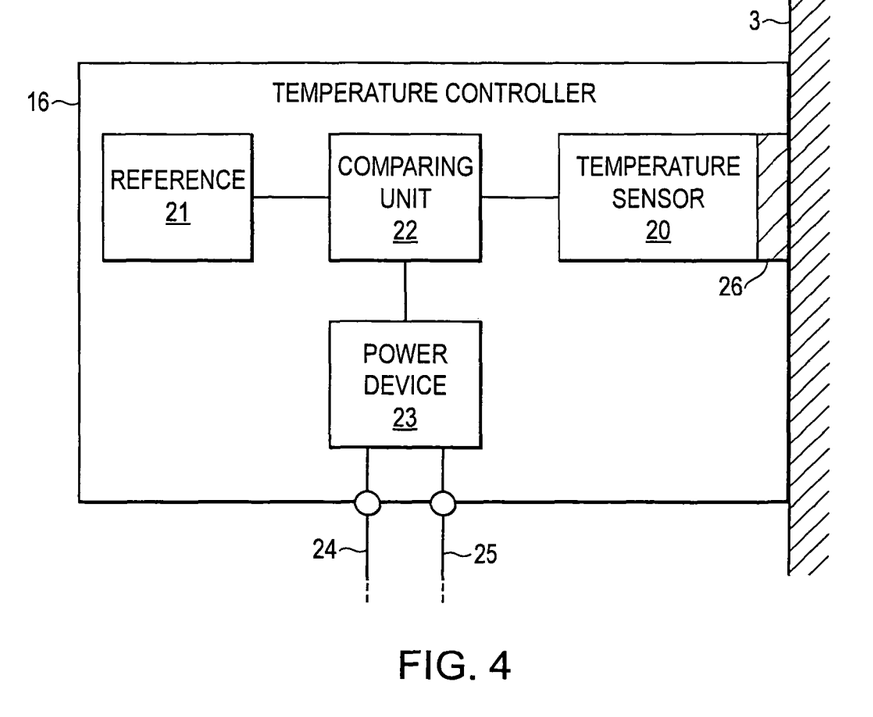
FIG. 4 illustrates various components integrated into the exemplary embodiment of the solid-state controller according to this disclosure.

FIGS. 3 and 4 show an exemplary embodiment of a system for temperature control. Temperature controller 16 is mounted directly on object 3 and controls the power from voltage source 4 to heater or cooler 2 in a similar manner to the system shown in FIGS. 1 and 2. Temperature controller 16, unlike that of a bimetallic strip controller, is entirely solid-state.

As shown in FIG. 4 various components are integrated inside the solid-state temperature controller 16. A temperature sensor 20 is provided. The temperature sensor 20 may include any kind of solid-state temperature sensor including, for example, a thermal couple, thermistor, RTD, diode, dedicated semiconductor temperature measurement device, or the like. This disclosure is not limited to only these sensors, but any known or future-developed temperature measurement or sensor device could be used.

If an RTD is used then the RTD may be wired in a resistive bridge arrangement to reduce susceptibility of the measurement or sensor circuit to changes in temperature of the solid-state temperature controller.

A heat conductor 26 couples the temperature sensor thermally to the object 3.

Temperature controller 16 may include a reference 21. The reference provides either a standardized voltage or current that is compared to the output voltage of the temperature sensor 20. The reference 21 may be any known or future developed reference component for voltage and current. However, the reference 21 must be stable to varying temperature. Also, any change in the value of the reference of the temperature must be known. This is because the solid-state temperature controller 16 will be at the same temperature as the object 3 to which it is attached. Therefore, any drift in output of the reference device due to changes in temperature of the object 3 and, therefore, the solid-state temperature controller 16, must be compensated.

The solid-state temperature controller 16 may further include comparing unit 22. The comparing unit 22 may be implemented in a number of ways, for example, as dedicated hardware, an FPGA, a PLA, an ASIC, a microcontroller or any other known or future method for implementing the a comparing unit 22. The comparing unit 22 compares the temperature measured by temperature sensor 20 with a temperature set point or set points derived from a reference 21. Based on this comparison, the comparing unit 22 may, in turn, control a power device 23 also contained in temperature controller 16. Comparing unit 22 also must be specified to work under the extreme temperature range required by object 3 as the comparing unit 22 will also be at the same temperature as object 3.

Power device 23 may be any device that can control a current delivered to a heater or cooler. Power device 23 may be, for example, a thyristor, TRIAC, power-FET, bipolar transistor or any other known or future developed like power control device. The control signals from comparing unit 22 switch power device 23 on and off allowing current to flow between leads 24 and 25. Power device 23 should also be specified to work under any extreme temperature range required by object 3. It must also switch the required voltages and currents at these extreme temperatures.

An exemplary temperature for the temperature controller 16 requires all components of the solid-state temperature controller 16 to operate without failure at extreme temperatures. For heater embodiments this includes temperatures above 70° C., and preferably above 90° C., and more preferably above 110° C. For cooler embodiments, this includes temperatures below 0° C., and preferably below −15° C. and more preferably below −30° C.

Temperature controller 16 may be programmed with a specific temperature set and deadband during manufacture and assembly. A range of temperature controller 16 may be manufactured with specific temperature sets or specific temperature ranges. Thus, for example, a particular temperature controller 16 may be manufactured that is specified for a set temperature of 100° C. with a deadband of 2° C. Temperature controller 16 may or may not be provided with a capacity to be reprogrammed to perform any other function. The set temperature may be anywhere in the preferable operating ranges with accuracy preferably at least 1° C. The deadband range, may preferably set as low as 5° C., and more preferably as low as 0.5° C.

Figure 5:
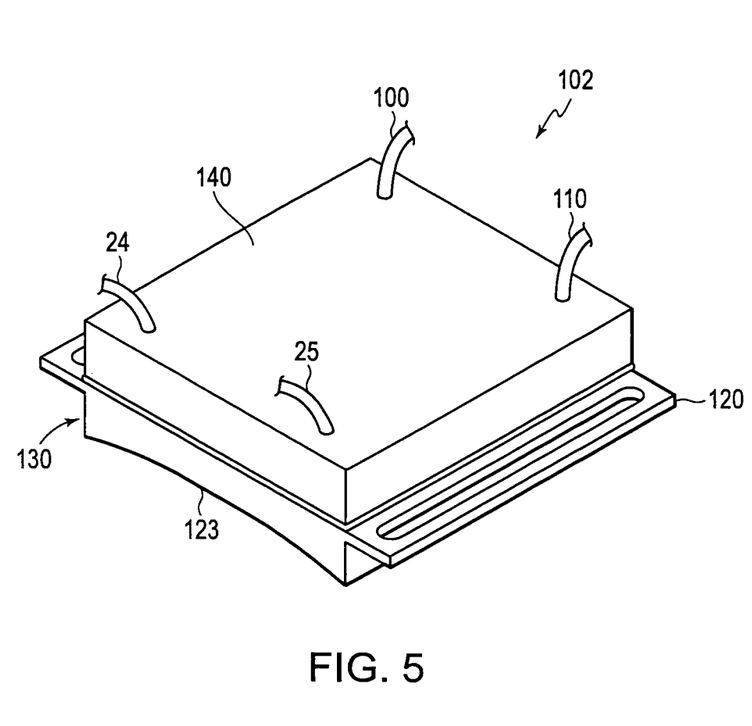
FIG. 5 illustrates an enclosure for the exemplary embodiment of the solid-state controller according to this disclosure.
Figure 6A:
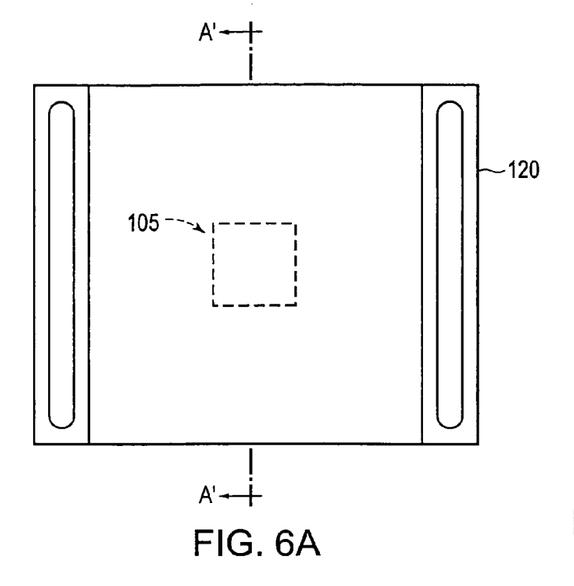
FIG. 6 illustrates the enclosure for the exemplary embodiment of the solid-state controller according to this disclosure view from different directions.
Figure 6B:
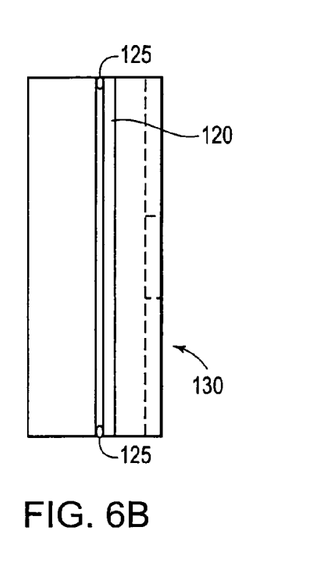
Figure 6C:
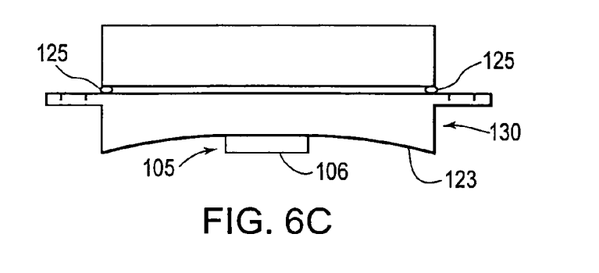
Figure 7:
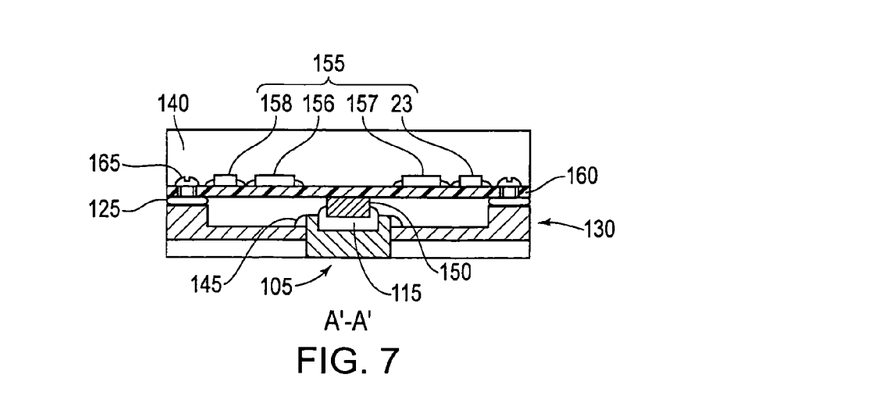
FIG. 7 illustrates a cross-section through the enclosure for the exemplary embodiment of the solid-state controller according to this disclosure view from different directions.

To maintain temperature accuracy and maintain the integrity of the temperature controller 16 over the above temperature range a number of specific features are incorporated into the temperature controller 16. FIGS. 5-7 show an exemplary embodiment of the enclosure for the temperature controller 16.

The enclosure 102 comprises a housing 130 that may be formed from a low thermal conductivity polymer capable of withstanding high temperatures. The polymer must withstand higher temperatures even than those indicated above because areas of the housing 130 that are in direct contact with the object 3 may experience transient temperatures outside those ranges. The low thermal conductivity of the polymer protects the rest of the temperature controller 16 from these transients. Suitable polymers may include, for example, mineral filled nylon.

The low thermal conductivity of the polymer additionally prevents the components inside the enclosure 102 from being subjected to thermal shock caused by rapid changes in temperature. Rapid changes in temperature within the enclosure may cause mechanical stress because temperature gradients can generate mechanical stress that can damage or break connections between components.

As shown in FIG. 5, the surface of the housing 130 that faces the object 3 may preferably be formed to include a concave facing surface 123. When attached to the object 3 by mounting ears 120, only the outermost edges of the housing 130 touch the object, further reducing the temperature conducted into the housing 130.

FIG. 6 shows a plan view from above the temperature controller 16 and side views of the temperature controller 16. A thermally conducting element or heat conductor 105 is positioned to protrude from the concave facing surface 123 of the housing 130. This protruding heat conductor 105 makes contact with the object 3 to be heated or cooled when the temperature controller 16 is mounted to the object 3 by mounting ears 120. The heat conductor 105 is not fixed rigidly to the housing 130 but is attached by a bead of an elastic compound 145, for example, room temperature vulcanization (RTV) silicone sealant. This non-rigid connection allows the protruding surface 106 of the heat conductor 105 to make contact with the object 3 over a large area, even if the surface of the object 3 and the facing surface 106 are not parallel or conformed before engagement. Further, the elasticity of the RTV silicone sealant means that the protruding surface 106 of the heat conductor 105 is held against the surface of the object 3 with a force corresponding to the deformation of the bead 145. The heat conductor 105 is preferably made from a high thermal conductivity metal for example aluminum. More preferably, anodized aluminum may be used.

FIG. 7 shows a cutaway through the temperature controller 16 along a line A'-A'. The heat conductor 105 is connected to a temperature sensor 150 by a non-rigid heat conductor 115. This non-rigid heat conductor 115 may be formed from a thermally conducting grease, for example, heat sink compound or flexible silicone rubber based heat transfer pads. The heat sink compound or transfer pads allow the heat conductor 105 to move with respect to the temperature sensor 150 without breaking the thermal connection. If heat transfer pads are used the compression of these heat transfer pads will also add to the force that holds the heat conductor 105 against the object 3 when compressed.

The temperature sensor 150 is mounted to a circuit board 160. This circuit board should also be capable of sustaining the large temperature range discussed above. The circuit board 160 may, for example, be made of Flame Retardant 4 (FR 4) material. The remaining circuit elements 155 used by the temperature controller 16 are, in this embodiment, mounted on the opposite side of the circuit board 160 and preferably away from the portion of the circuit board 160 on the opposite side of the temperature sensor 150. The FR 4 material is also a poor thermal conductor and therefore isolates the temperature sensor 150 thermally from the rest of the temperature controller 16 components. Copper tracks electrically connecting the temperature sensor 150 to the rest of the circuit are designed to be long and narrow so as to reduce heat conduction via these tracks to the rest of the circuit. Further, the FR 4 material is made to be free of any other copper tracks or copper planes near to the temperature sensor 150. This aids in isolating the temperature sensor 150 thermally from the rest of the temperature controller 16, and means that the temperature of the temperature sensor 150 will closely track the temperature of the heat conductor 105 and, thus, the object 3.

All parts for the circuit in this embodiment are specified, for operation at least within the automotive temperature range of −40° C. to +125° C. The remaining circuit elements 155 may include a microcontroller 156 and voltage regulator 157 for providing a low voltage to the microcontroller 150. The voltage regulator 157 also providing low-power standby functions by shutting down power to various parts of the circuitry when required.

The voltage regulator 157 may also provide an internally compensated voltage reference with the stability of (+0/− 0.5%) worst case over the specified operating range.

In this embodiment, the supply voltage to the circuit board 160 is preferably between 6V DC to 24V DC. This power may be supplied by insulated cables 100 and 110. As well as supplying the voltage regulator 157 this voltage may supply high voltage switching components for the power device 23 that is also mounted on circuit board 160. This disclosure is not limited to voltages between 6V DC to 24V DC. High voltage versions may also be implemented with the other features disclosed. Further, versions of the temperature controller 16 may also be implemented that are supplied with AC voltages of different frequencies and voltages.

In this embodiment, the comparing unit 22 is implemented with the microcontroller 156 that includes an internal A/D converter, with the internally compensated voltage reference of the voltage regulator 157 providing a reference for the microcontroller's internal A/D converter.

The temperature sensor 150 is preferably an RTD. The RTD is mounted in a resistor bridge the resistors 158 for the bridge mounted on the circuit board 160 at some distance from the RTD with the other circuit elements 155. The resistor bridge configuration is driven in this embodiment by the internally compensated voltage reference in the voltage regulator 157. Because both the resistor bridge reference voltage and the reference voltage for the A/D converter in the microcontroller are identical, drift of this voltage reference does not affect any temperature measurement.

Despite the above features to prevent thermal gradients within the temperature controller from affecting the integrity of the circuit board 160 and the components attached to the circuit board 160, the circuit board 160 itself will still expand and contract depending upon the temperature of the object 3. Rigidly mounting the circuit board 160 within the housing, for example, would cause the circuit board 160 to warp as the temperature changes. This may damage the circuit board 160 or destroy connections between the circuit board 160 and the components mounted to it. For this reason, the circuit board 160 is attached to the housing 130 by self tapping screw 165 and O-rings 125. These self tapping screws 165 hold the circuit board 160 to the housing 130 by holes in the circuit board 160. The holes are large enough that there is play between the self tapping screws 165 and the circuit board 160. The O-rings 125 are made of an elastic material and are placed between the circuit board 160 and the housing 130. The self tapping screws 165 go through holes in the O-rings 125 and are tightened so as not to fully compress the O-rings 125. This allows the circuit board 160 to expand and contract without warping, but the compressed O-rings 125 hold the circuit board 160 in place so that good contact is maintained between the temperature sensor 150 and the heat conductor 115.

To prevent incursion of, for example, dust, mist, spray and snow the upper portion of the circuit board 160 and the components 155 mounted there, the upper portion is encapsulated in a potting compound 140. The potting compound 140 is selected so that relative differences in thermal expansion between the potting compound 140 and the circuit board 160 and components do not cause stress that damages the components 155 or any connections between the components. For this reason, potting compounds with relative high pliability, low coefficient of expansion, low residual stress due to curing and wide temperature ranges are used. An example of such a potting compound 140 is the polymer Tough-Seal 21™ manufactured by Key Polymer Corporation. The potting compound 140 thus protects the components attached to the circuit board 160 and acts as a cable clamp for wires 24, 25, 100 and 110 that emerge from the potting compound 140.

Figure 8:
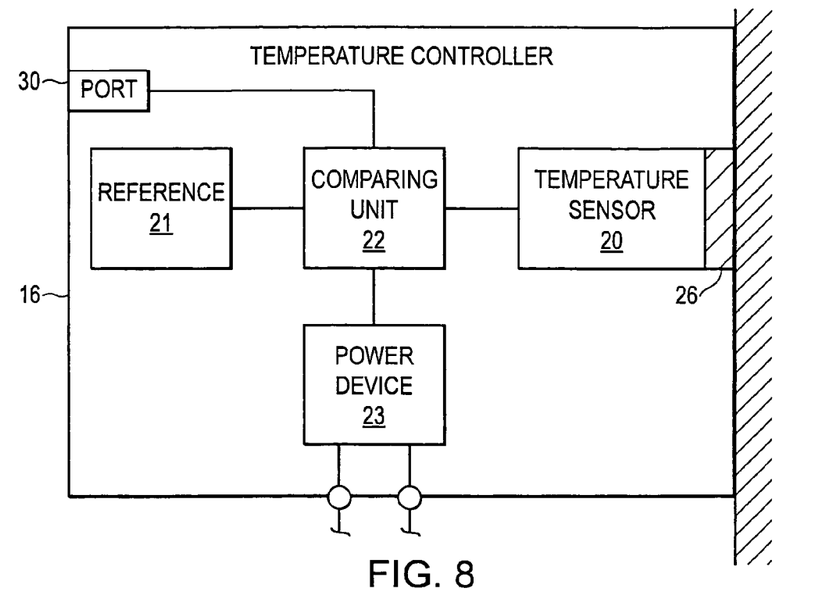
FIG. 8 illustrates wired methods for reprogramming the exemplary embodiment of the solid-state controller according to this disclosure.

The temperature controller 16 may include additional features to make programming and set up of the temperature controller 16 more convenient. As shown in FIG. 8, a port 30 may be added to the temperature controller 16. By connecting a separate programmer to port 30, the comparing unit 22 may be reprogrammed, for example, with a different set point temperature and deadband. Using such a compatible programmer, a single temperature controller 16 may be manufactured and then either programmed appropriately before shipping to a customer or shipped to a customer and then programmed by the customer. The temperature controller 16 could then also be reprogrammed at any time, or could also be a one time programmable device. The one time programmable device may be appropriate where it is determined that it is essential that the device cannot be reprogrammed once installed in its final location.

Figure 9:
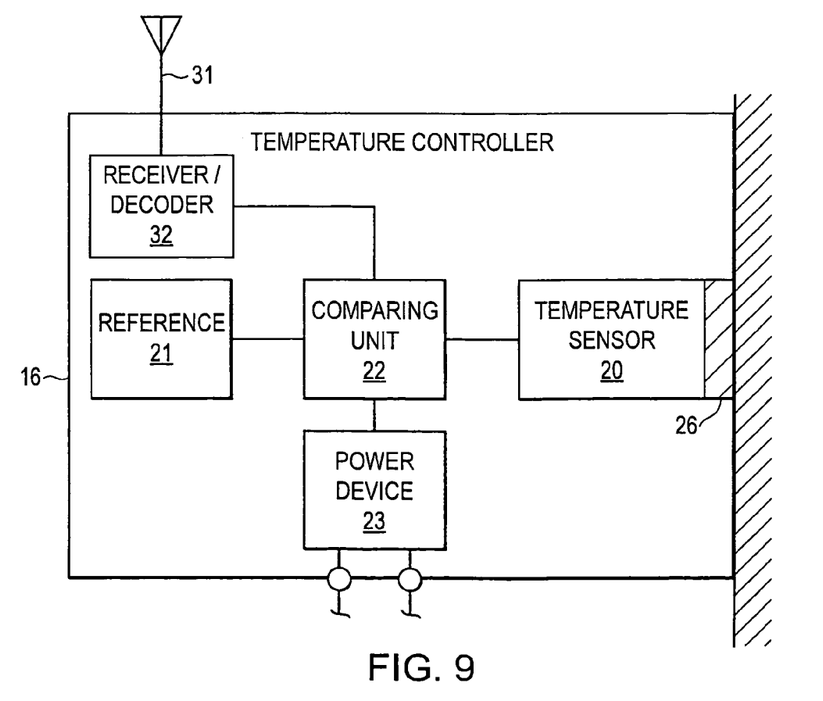
FIG. 9 illustrates wireless methods for reprogramming the exemplary embodiment of the solid-state controller according to this disclosure.

FIG. 9 shows an alternate embodiment. In this embodiment, an antenna 31 and a receiver and decoder 32 may be incorporated into the solid-state temperature controller 16. Using a wireless transmitter connected to a wireless programmer, the programmer could then program the comparing unit 22 via the wireless link to antenna 31, and receiver and decoder 32. This device may allow the solid-state temperature controller 16 to be reprogrammed with a new set point temperature and deadband using the wireless programmer. This may allow the solid-state temperature controller 16 to be reprogrammed at any time in its life. Moreover, solid-state temperature controllers 16 installed in areas that are inaccessible due to confined spaces or even hostile environments, can be reprogrammed at any time from a safe distance or safe environment.

Figure 10:
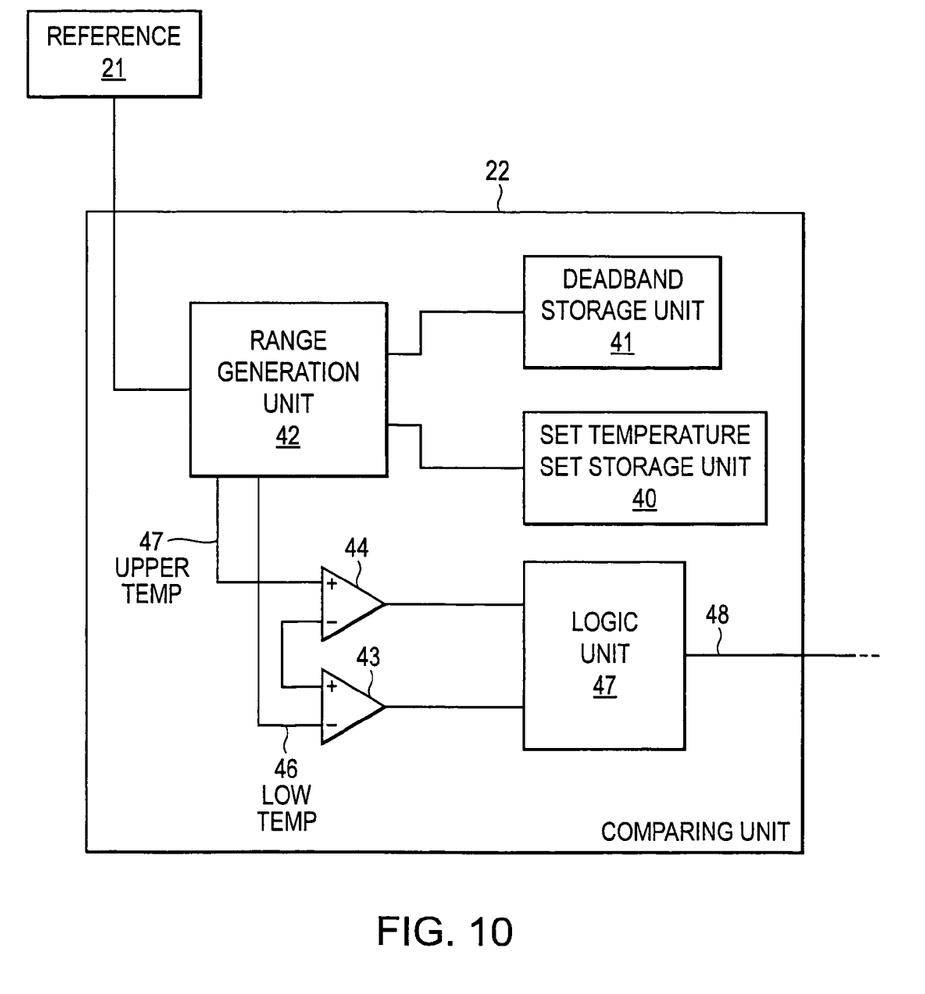
FIG. 10 illustrates a first exemplary control system and components of that control system within the exemplary embodiment of the solid-state controller according to this disclosure.

FIG. 10 illustrates various features that may be incorporated into comparing unit. A set temperature storage unit 40 may store the present or programmable set temperature. A deadband storage unit 41 may store a range of temperature of which the object 3 is allowed to vary based on the output from the reference 21 and the value stored in the set temperature set storage unit 40 and the deadband storage unit 41

A range generation unit 42 may generate an upper temperature reference 45 and lower temperature reference 46. Comparators 43 and 44 may compare the temperature from the temperature sensor 20 to the upper temperature reference 45 and the lower temperature reference 46. The outputs from comparators 43 and 44 may be fed into a logic unit 47. If the temperature from temperature sensor 20 exceeds upper temperature reference 45, the logic unit 47 may send a signal on output wire 48 to switch off power control device 23. If the temperature from temperature sensor 20 is below lower temperature reference 46, the logic unit 47 may send a signal on output wire 48 to switch on power control device 23. This solid-state circuit mimics the control function formed by a bimetallic strip.

Because a solid-state device is used for control, the control function is not limited to circuits above that mimic the control performed by a bimetallic strip controller, and more sophisticated control mechanisms can also be adapted.

Figure 11:
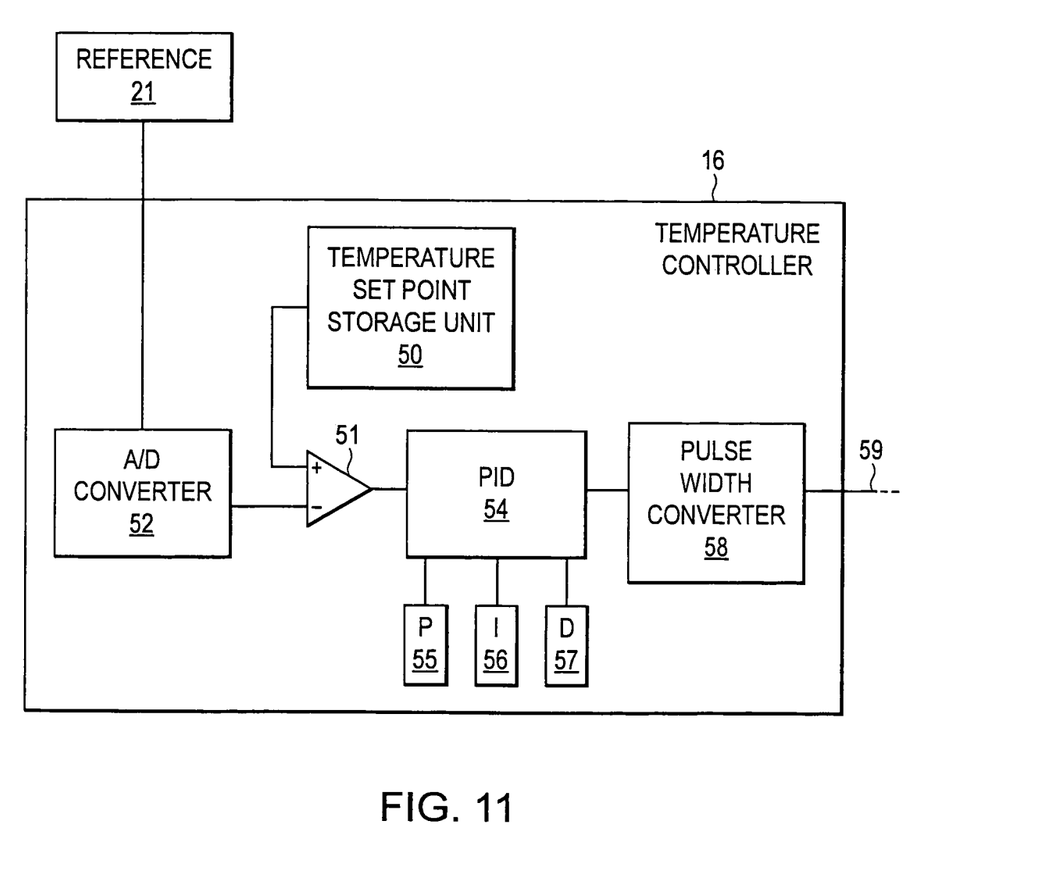
FIG. 11 illustrates a second exemplary control system and components of that control system within the exemplary embodiment of the solid-state controller according to this disclosure.

FIG. 11 illustrates a system for providing PID control for temperature control in the solid-state temperature controller 16. A temperature set point storage unit 50 may be used to store a set point temperature. Analog to digital converter 52 may convert the temperature measured by temperature sensor 20 into a digital value based upon a reference voltage provided by reference 24.

A comparator unit 51 may compare the output from analog to digital converter 52 with the stored set point value and may generate an error signal 53 indicating the error between the set temperature value and the current temperature. Error signal 53 may be fed into a proportional integral differential controller 54 (PID). The HD may generate a signal corresponding to the heating or cooling required to reduce the error generated by comparator 51. The output is based on the value stored in proportional storage unit 55, integral storage unit 56 and differential storage unit 57. HD controllers are well known in the art and will not be described in more detail.

The output from the PID controller may be fed to a converter 58. Converter 58 may convert the output from PID controller 54 into a digital signal whose time average, for a predetermined time interval, corresponds to the output of the PID controller 54. Converter 58 may be, for example, a pulse width modulation device, frequency modulation device, phase modulation device or any other known converter or future converter that performs this function. A converted signal may be fed to the power control device 23 via output 59. The advantage of this controller is that the time average power supplied by the heater can be somewhere between the heater or cooler being fully on and fully off. Thus, if the object 3 is at slightly too high a temperature, the temperature controller 16 can slightly reduce the time average power supplied to a heater until the temperature is correct. Thus, there is no deadband range when using this kind of controller. Further, if for some reason conditions around the object 3 change so that the heat lost changes, the temperature controller 16 can adapt and supply slightly more or less power to maintain constant temperature.

The proportional, integral and differential signals may be set at manufacture in the same manner as the set temperature and the deadband described above. The proportional, integral and differential values are critical to maintaining the stability of the control system formed by temperature control 16 and the heat capacity and heating power of the object 3 and heater or cooler 12, respectively. A system with inappropriate proportional, integral and differential values may not maintain a stable temperature. It will either oscillate between extremes of temperature, or never reach the set temperature. Therefore, from application to application, the proportional, integral and differential values will be different, and an installer may have to program these values based on experimental or modeled data for the object 3 and the heater or cooler 2. Programming techniques using a port 30 or the antenna 31 and radio receiver and decoder 32 as shown in FIGS. 5 and 6 can be used to program the proportional, integral and differential values as needed.

Figure 12:
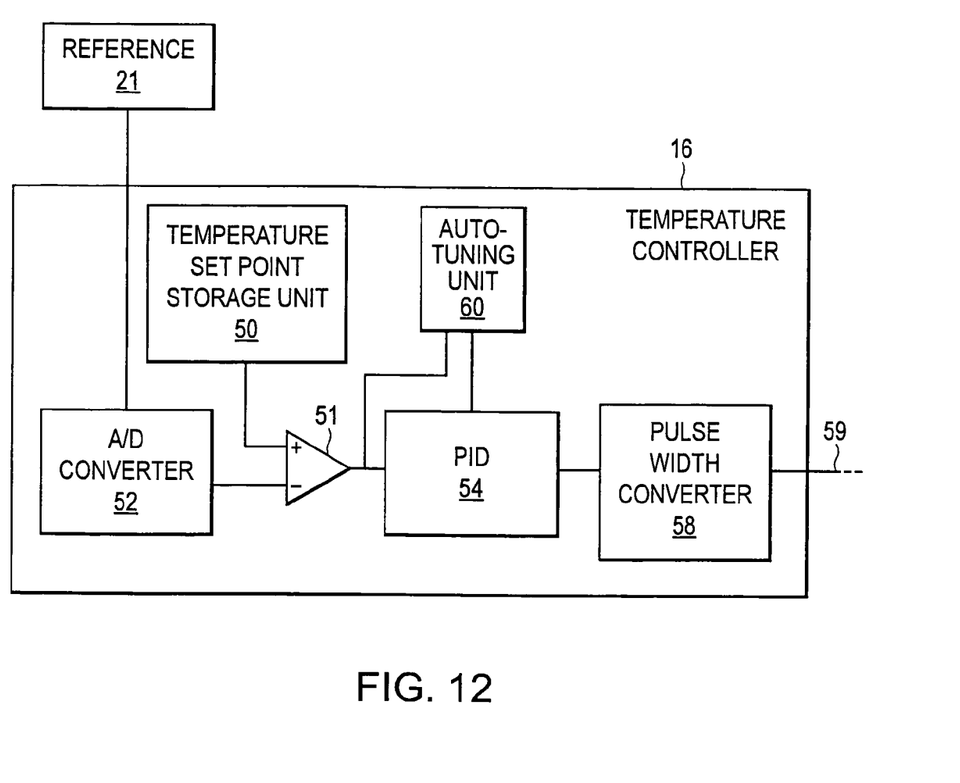
FIG. 12 illustrates a third exemplary control system and components of that control system within the exemplary embodiment of the solid-state controller according to this disclosure.

FIG. 12 shows an alternate embodiment for temperature control in the solid-state temperature controller that removes this need to program the proportional, integral and differential values. Auto-tuning unit 60 may monitor the performance of the controller formed by temperature controller 16, heater or cooler 2 and object 3. The auto-tuning unit 60 may modify the proportional, integral and differential values to prevent the system from oscillating but also to allow the system to reach an equilibrium temperature as fast as possible. In this manner, the PID controller may be adapted to a system in which it is placed, without the need to be specifically programmed.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A device for controlling temperature of an object or space comprising:
   a package physically connected to the object or space in which the temperature is to be controlled, the package being an integral unit comprising:
   a solid-state temperature sensor that senses the temperature of the object or the space;
   at least one of a current or voltage reference that provides a temperature reference;
   a comparing unit that compares a sensed temperature signal from the solid-state temperature sensor with the temperature reference and generates a switching signal based on that comparison;
   a solid-state switch that outputs a control signal from the package based on the generated switching signal from the comparing unit;
   a first thermal conductor that protrudes from a surface of the package and contacts the object or a surface in the space; and
   a second mechanically non-rigid thermal connector disposed between the first thermal conductor and the solid-state temperature sensor and that transfers the thermal state of the object or the surface in the space from the first thermal conductor to the solid-state temperature sensor; and
   a temperature changing unit connected to the package, and controlled by the control signal from the package,
   wherein the temperature changing unit controls the temperature of the object or the space in a range of greater than 90° C.

2. The device according to claim 1, wherein the temperature changing unit controls the temperature of the object or the space in a range of greater than 110° C.

3. The device according to claim 1, wherein the surface from which the first thermal conductor protrudes is concave.

4. The device according to claim 1, wherein a set temperature of the device has an accuracy of less than ±0.1° C.

5. The device according to claim 1, wherein the comparing unit switches the solid-state switch on if a temperature measured by the solid-state temperature sensor is below a first temperature, and switches the solid-state switch off if the temperature measured by the solid-state temperature sensor is above a second temperature, the difference between the first temperature and the second temperature defining a deadband for the device.

6. The device according to claim 5, wherein the deadband is less than 0.5° C.

7. The device according to claim 5, wherein the first temperature and the second temperature are set via a wired or wireless connection from an external programmer.

8. The device according to claim 1, wherein the comparing unit is a proportional integral differential controller.

9. The device according to claim 8, wherein the comparing unit generates the switching signal using a pulse width modulation or frequency modulation technique.

10. A device for controlling temperature of an object or space comprising:
    a package physically connected to the object or space in which the temperature is to be controlled, the package being an integral unit comprising;
    a solid-state temperature sensor that senses the temperature of the object or the space;
    at least one of a current or voltage reference that provides a temperature reference;
    a comparing unit that compares a sensed temperature signal from the solid-state temperature sensor with the temperature reference and generates a switching signal based on that comparison;
    a solid-state switch that outputs a control signal from the package based on the generated switching signal from the comparing unit;
    a first thermal conductor that protrudes from a surface of the package and contacts the object or a surface in the space; and
    a second mechanically non-rigid thermal connector disposed between the first thermal conductor and the solid-state temperature sensor and that transfers the thermal state of the object or the surface in the space from the first thermal conductor to the solid-state temperature sensor; and
    a temperature changing unit connected to the package, and controlled by the control signal from the package,
    wherein the temperature changing unit controls the temperature of the object or the space in a range of less than −15° C.

11. The device according to claim 10, wherein the temperature changing unit controls the temperature of the object or the space in a range of less than −30° C.

12. The device according to claim 10, wherein the surface from which the first thermal conductor protrudes is concave.

13. The device according to claim 10, wherein a set temperature of the device has an accuracy of less than ±0.1° C.

14. The device according to claim 10, wherein the comparing unit switches the solid-state switch on if a temperature measured by the solid-state temperature sensor is below a first temperature, and switches the solid-state switch off if the temperature measured by the solid-state temperature sensor is above a second temperature, the difference between the first temperature and the second temperature defining a deadband for the device.

15. The device according to claim 14, wherein the deadband is less than 0.5° C.

16. The device according to claim 14, wherein the first temperature and the second temperature are set via a wired or wireless connection from an external programmer.

17. The device according to claim 10, wherein the comparing unit is a proportional integral differential controller.

18. The device according to claim 17, wherein the comparing unit generates the switching signal using a pulse width modulation or frequency modulation technique.

19. A device for controlling temperature of an object or space comprising:

a package immediately adjacent and physically connected to the object or space in which the temperature is to be controlled, the package being an integral unit comprising:
a solid-state temperature sensor that senses the temperature of the object or the space,
at least one of a current or voltage reference that provides a temperature reference,
a comparing unit that compares a sensed temperature signal from the solid-state temperature sensor with the temperature reference and generates a switching signal based on that comparison, and
a solid-state switch that outputs a control signal from the package based on the generated switching signal from the comparing unit;
a temperature changing unit connected to the package, and controlled by the control signal from the package; and
a thermal conductor that protrudes from a surface of the package and contacts the object or a surface in the space to transfer the thermal state of the object or the surface in the space to the solid-state temperature sensor,
wherein the temperature changing unit controls the temperature of the object or the space in a range of greater than 90° C.; and
wherein the at least one of a current or voltage reference, the comparing unit, and the solid-state switch are thermally isolated from the solid-state temperature sensor.

20. The device according to claim 19, further comprising a circuit board made of a low thermal conductivity material;
wherein the solid-state temperature sensor is located on one side of the circuit board; and
wherein the at least one of a current or voltage reference, the comparing unit and the solid-state switch are mounted on the opposite side of the circuit board from the solid-state temperature sensor.

21. The device according to claim 20, further comprising a housing comprised of a low thermal conductivity polymer;
wherein the solid-state temperature sensor, the at least one of a current or voltage reference, the comparing unit, the solid-state switch and the circuit board are located within the housing.

22. The device according to claim 21, wherein the circuit board is movably mounted to the housing such that relative movement between the circuit board and the housing is permitted.

23. A device for controlling temperature of an object or space comprising:
a package immediately adjacent and physically connected to the object or space in which the temperature is to be controlled, the package being an integral unit comprising:
a solid-state temperature sensor that senses the temperature of the object or the space,
at least one of a current or voltage reference that provides a temperature reference,
a comparing unit that compares a sensed temperature signal from the solid-state temperature sensor with the temperature reference and generates a switching signal based on that comparison, and
a solid-state switch that outputs a control signal from the package based on the generated switching signal from the comparing unit;
a temperature changing unit connected to the package, and controlled by the control signal from the package; and
a thermal conductor that protrudes from a surface of the package and contacts the object or a surface in the space to transfer the thermal state of the object or the surface in the space to the solid-state temperature sensor;
wherein the temperature changing unit controls the temperature of the object or the space in a range of less than −15° C.; and
wherein the at least one of a current or voltage reference, the comparing unit, and the solid-state switch are thermally isolated from the solid-state temperature sensor.

24. The device according to claim 23, further comprising a circuit board made of a low thermal conductivity material;
wherein the solid-state temperature sensor is located on one side of the circuit board; and
wherein the at least one of a current or voltage reference, the comparing unit and the solid-state switch are mounted on the opposite side of the circuit board from the solid-state temperature sensor.

25. The device according to claim 24, further comprising a housing comprised of a low thermal conductivity polymer;
wherein the solid-state temperature sensor, the at least one of a current or voltage reference, the comparing unit, the solid-state switch and the circuit board are located within the housing.

26. The device according to claim 25, wherein the circuit board is movably mounted to the housing such that relative movement between the circuit board and the housing is permitted.

27. A device for controlling temperature of an object or space comprising:
a package configured to be physically connected to the object or space in which the temperature is to be controlled, the package being an integral unit comprising:
a solid-state temperature sensor that senses the temperature of the object or the space,
at least one of a current or voltage reference that provides a temperature reference,
a comparing unit that compares a sensed temperature signal from the solid-state temperature sensor with the temperature reference and generates a switching signal based on that comparison, and
a solid-state switch that outputs a control signal from the package based on the generated switching signal from the comparing unit; and
a first thermal conductor that protrudes from a surface of the package to contact the object or a surface in the space; and
a second mechanically non-rigid thermal connector disposed between the first thermal conductor and the solid-state temperature sensor and that transfers the thermal state of the object or the surface in the space from the first thermal conductor to the solid-state temperature sensor;
wherein the device is designed to control the temperature of the object or the space in a range of greater than 90° C.

* * * * *